Aug. 21, 1928.
E. A. RUSSELL
1,681,626
FLEXIBLE PIPE JOINT
Original Filed Jan. 19, 1925    2 Sheets-Sheet 1
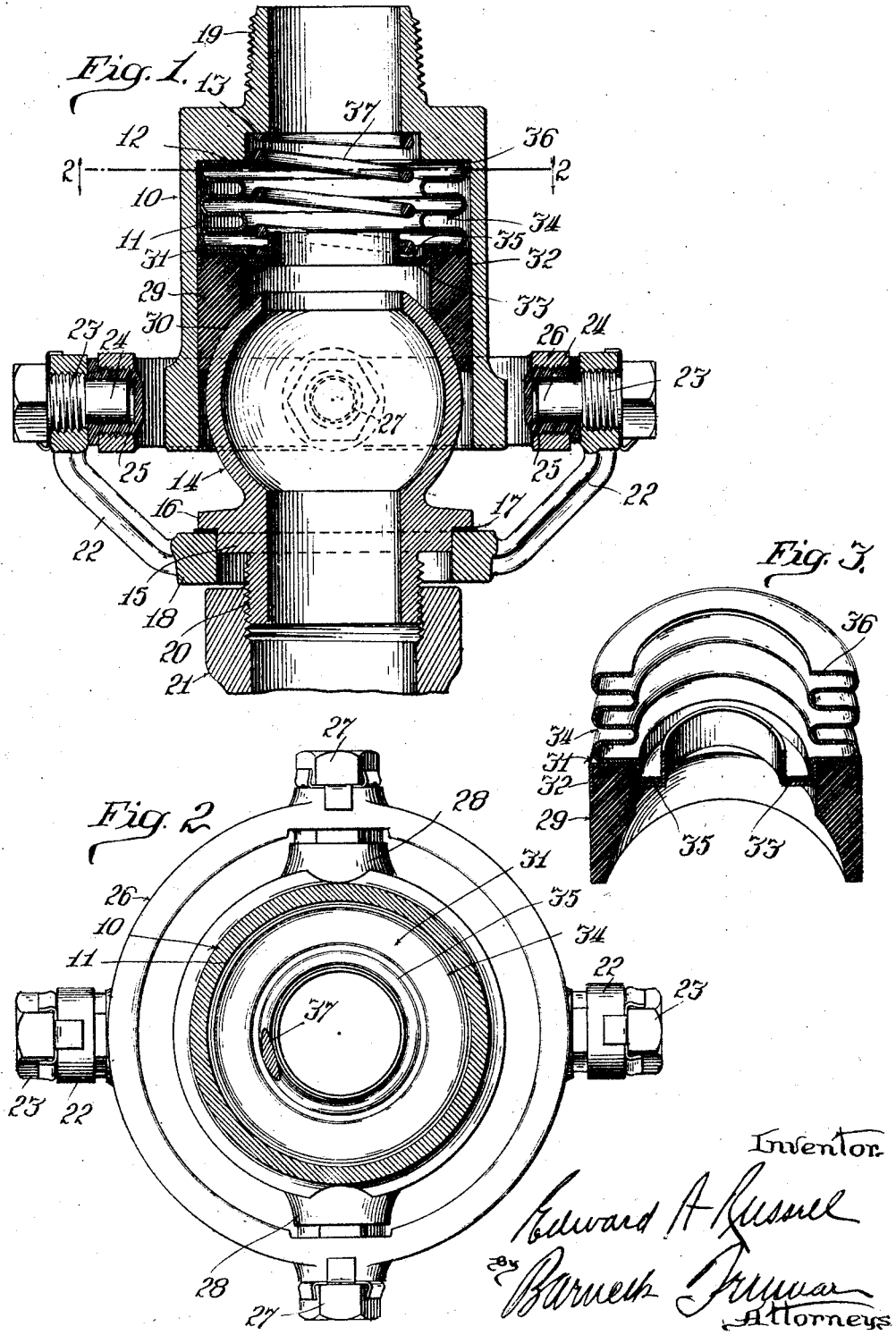

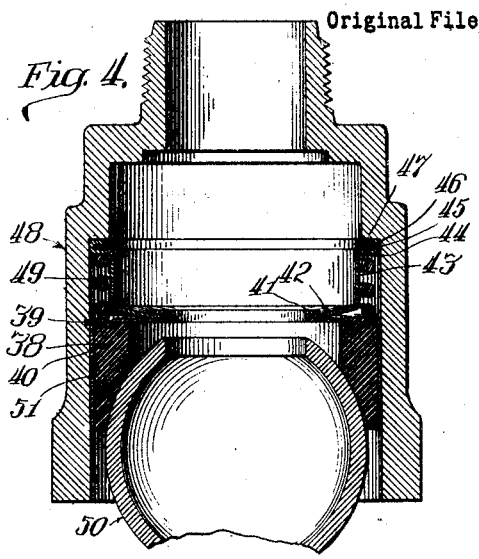
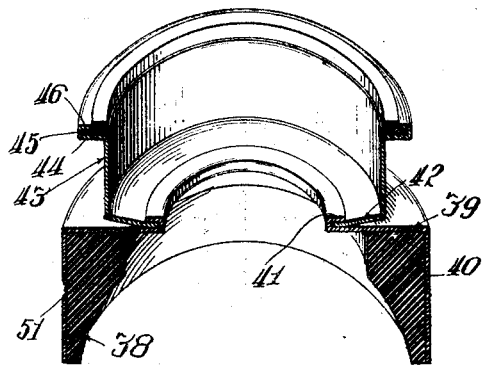
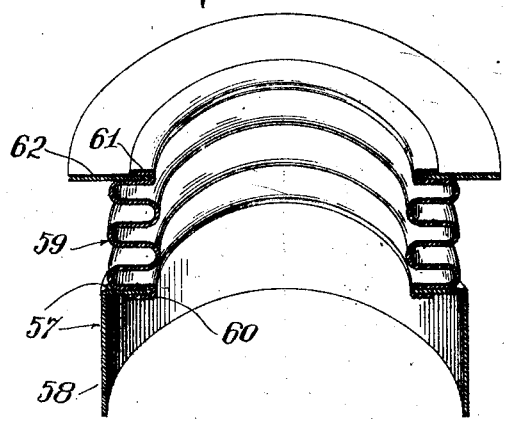
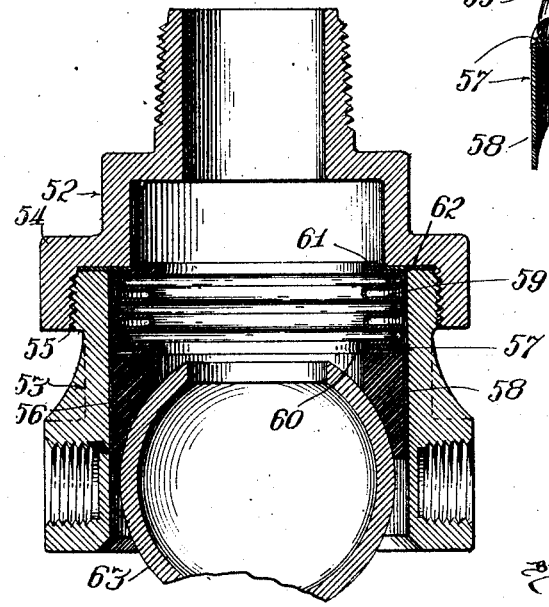

Patented Aug. 21, 1928.

1,681,626

UNITED STATES PATENT OFFICE.

EDWARD A. RUSSELL, OF CHICAGO, ILLINOIS, ASSIGNOR TO VAPOR CAR HEATING COMPANY, INC., OF CHICAGO, ILLINOIS, A CORPORATION OF NEW YORK.

FLEXIBLE PIPE JOINT.

Original application filed January 19, 1925, Serial No. 1,407. Divided and this application filed February 27, 1926. Serial No. 91,150.

My invention relates to a flexible pipe joint of the type comprising a socket member, a ball member, and articulating means between the ball and socket members to allow movement of said members with respect to each other within certain limits, the articulating means being preferably such as to hold the ball member out of contact with the socket member so that high internal pressure does not seriously affect the flexibility of the joint through excessive friction, as would be the case if the ball turned in a closely fitting spherically curved socket.

The principal object of the invention is to provide sealing means for a joint of this sort including a gasket of rubber composition, or the like, arranged between the socket member and the inner end of the ball member, which sealing means will be self adjusting to accommodate itself to the wear, both of the gasket and of the other parts of the joint, so as to maintain the seal, and which will be of such construction as not to interfere with the flexibility of the joint when such inevitable wear takes place.

The flexible joint of this invention is intended to be used particularly as part of a pipe connection between the steam or air train line sections, more particularly steam train line sections, of the adjacent cars of a railway train. Such connection must be flexible under the high pressures carried in the train lines on modern railway trains and the seal must be effective at all times and under all conditions not only to prevent waste of the fluid but also to prevent destruction or disintegration of the gasket which is likely to take place if a leak of high pressure steam, for example, is allowed to start.

The invention is illustrated in certain preferred embodiments, in the accompanying drawings, wherein Fig. 1 is a longitudinal sectional view of a pipe joint provided with sealing means in accordance with my present invention.

Fig. 2 is a sectional view on line 2—2 of Fig. 1.

Fig. 3 is a longitudinal view, in perspective, of the sealing means.

Fig. 4 is a longitudinal view, with certain parts not shown, of a joint like that shown in Fig. 1, but provided with a modified form of sealing means.

Fig. 5 is a sectional perspective of the sealing means shown in Fig. 4.

Fig. 6 is a view similar to Fig. 4 but embodying certain further modifications, and Fig. 7 is a sectional perspective of a part of the sealing means shown in Fig. 6.

Referring first to Figs. 1, 2 and 3, 10 designates a socket member having a cylindrical bore 11 and inwardly projecting shoulders 12 and 13. 14 is a ball member extending within but out of contact with the inner surface of the socket member and formed with a neck portion 15 having a flange 16 rabbeted at 17 for a swivel ring 18 which is revoluble on the flange 16 of the neck of the ball member. The socket member is shown as provided with a threaded portion 19 and the ball member with a threaded portion 20. 21 indicates a pipe secured to the ball member and forming part of the flexible pipe connection of which the joint as a whole constitutes an element.

The ball member is suitably articulated, for universal movement, with the socket member. Preferably the swivel ring 18 is formed with a pair of diametrically arranged arms 22 provided with pivot studs 23, the inner ends 24 of which project into sockets 25 set into a ring 26 surrounding the outer end of the socket member 10. At right angles to the pivot studs 23 are a pair of pivot studs 27 secured to and extending through the ring 26 and projecting into sockets formed in bosses 28 on the socket member 10. With the construction of joint as described the ball and socket members are capable of universal movement with respect to each other within certain limits and also of swiveling or rotative movements axially of the joint.

Arranged between the socket member and the inner end of the ball member is an exteriorly cylindrical gasket 29 of rubber composition. This gasket has a spherical surface 30 to fit the outer surface of the ball member. The outer cylindrical surface of the gasket makes a fairly snug fit with the bore of the socket member but the gasket is freely slidable in the socket so that it has a follow-up action, under internal fluid pressure, to compensate for wear. In the embodiment of the invention shown the inner end of the gasket is provided with a metal armoring ring 31 formed preferably with an outturned external flange 32 and with a channel-shaped internal flanged portion 33. Interposed between the armoring ring 31 and the shoulder 12 on the socket member 10 is a corrugated metal diaphragm 34 of the bellows diaphragm type provided preferably with an angular offset portion 35 fitting into the channeled flange 33 of the armoring ring, the inner web 36 of the diaphragm lying flatwise against the shoulder 12 of the socket member. A coiled spring 37 is preferably interposed between the channel flange 33 or spring seat of the gasket armoring and the shoulder 13 of the socket member. This spring may be dispensed with and the bellows diaphragm utilized for imparting spring pressure to the gasket. As a matter of fact, a spring is necessary only when the joint is not under steam. When under steam the fluid pressure will keep the gasket in its operative position and give it the necessary follow-up action. The corrugated diaphragm 34 performs two additional functions: It effectively excludes the steam from such crack or space as there may be between the gasket and the socket member. This is important particularly when steam first enters the joint and the gasket is relatively cold. It also expands under internal pressure so as to increase the forward pressure on the gasket.

A somewhat different sealing arrangement is shown in Figs. 4 and 5. The gasket 38 is provided with an armoring ring 39 having a flange 40 extending over the entire exterior surface of the gasket. To this ring is beaded at 41 a flexible diaphragm 42 having a cylindrical portion 43 terminating in a flange 44 beaded over a gasket 45 as indicated at 46. The gasket 45 is of relatively soft material and bears against shoulder 47 on the socket member 48. A coiled spring 49 is interposed between flange 44 and the armoring ring 39. This spring operates to keep the gasket pressed against the ball member 50 when the joint is not under steam, and to force the gasket 45 against shoulder 47. I have shown the flange 40 of the armoring ring struck into the gasket at 51 for the purpose of securing these parts together. The annulus 42 is sufficiently flexible to allow the follow-up movement of the gasket.

A sealing device more like that shown in Figs. 1, 2 and 3, but with certain modifications, is illustrated in Figs. 6 and 7. The socket member is made in two sections 52, 53, the section 52 having an internally threaded cap portion 54 engaging the threaded end 55 of section 53. The gasket 56 is provided with an armoring ring 57 shown as having a cylindrical flange 58 overlapping the outer surface of the gasket. A corrugated metallic diaphragm 59 has its outer edge beaded at 60 to ring 57 and its inner edge beaded at 61 to a ring 62 which is clamped between the two sections 52, 53 of the socket member. This diaphragm serves as a spring to hold the gasket in place against the ball member 63 when the joint is not under steam. When steam or other fluid under pressure is admitted to the joint the diaphragm is expanded so as to maintain sufficient pressure against the gasket to insure the desired follow-up action. The engagement of the upper edge of the diaphragm with the socket member effectively prevents any leakage of steam between the outer surface of the gasket and the bore of the socket member. Such sealing means is particularly desirable when the gasket is completely armored since in such case the expansion of the gasket under heat can not be relied upon to effect the necessary seal. On the other hand, the armoring of the gasket increases its life.

This application is a division of my copending application Serial No. 1407, filed January 19, 1925, and renewed January 9, 1926.

Realizing that the invention is susceptible of further modifications, I desire to cover all differences in construction within the scope of the appended claims.

I claim:

1. In a flexible pipe connection, a socket member having a substantially cylindrical recess, a ball member projecting within this recess, connecting means for holding the ball centered within but out of contact with the socket member and permitting free angular movement thereof, a gasket freely slidable within the recess and bearing at one end against the ball member, a sealing device comprising an annular follower behind the gasket, an annular plate clamped into the socket member, and a flexible sealing member secured at opposite edges to the follower and the plate.

2. In a flexible pipe connection, a socket member having a substantially cylindrical recess, a ball member projecting within this recess, connecting means for holding the ball centered within but out of contact with the socket member and permitting free angular movement thereof, a gasket freely slidable within the recess and bearing at one end against the ball member, and a sealing device comprising an annular follower behind the gasket, an annular plate clamped into the socket member, and a corrugated diaphragm mounted within the recess behind the gasket and secured at one end to the follower and at its other end to the plate.

3. In a flexible joint, the combination of an interiorly cylindrical socket member, a ball member projecting into the socket member, articulating means between said members permitting relative angular movements thereof while holding one of said members out of contact with the other, an exteriorly cylindrical rubber composition gasket slidably arranged in and in contact with the interior cylindrical surface of the socket member to bear against the inner end of the ball member, a metallic armoring on the outer cylindrical surface of said gasket, and a flexible, corrugated tubular diaphragm interposed between the inner end of said gasket and a part of said socket member.

4. In a flexible pipe connection, a socket member formed of two connected sections and having a substantially cylindrical recess, a ball member projecting within the recess, connecting means for holding the ball centered within but out of contact with the socket member and permitting free angular movement thereof, a gasket freely slidable within the recess and bearing at one end against the ball member, and a sealing device comprising an annular plate clamped at its outer edge between the sections of the socket member, a follower engaging the rear end of the gasket and having an annular inwardly extending flange, and a flexible member secured at opposite ends to the follower flange and to the inner edge of the plate.

5. In a flexible pipe connection, a socket member formed of two connected sections and having a substantially cylindrical recess, a ball member projecting within the recess, connecting means for holding the ball centered within but out of contact with the socket member and permitting free angular movement thereof, a gasket freely slidable within the recess and bearing at one end against the ball member, and a sealing device comprising an annular plate clamped at its outer edge between the sections of the socket member, a follower engaging the rear end of the gasket and having an annular inwardly extending flange, and a corrugated diaphragm secured at one end to the inner edge of the plate and at the opposite end to the flange on the follower.

6. In a flexible joint, the combination of a socket member having a cylindrical bore, a ball member extending into the socket member, means for articulating said ball member with the socket member, with capacity for universal movement with respect thereto, an exteriorly cylindrical annular gasket of compressible non-metallic material closely fitting but slidable within the socket member against the inner end of the ball member, an annular metallic follower engaging the rear end of the gasket, and a tubular longitudinally expansible metallic sealing member interposed under compression between the follower and a portion of the socket member whereby the gasket is yieldingly forced between the socket and ball members with a capacity for follow-up movement to allow for wear of the parts, the tubular member forming a continuous wall around the steam passage to seal the joint against escape of steam between the gasket and socket member in all positions of the gasket.

7. In a flexible joint, the combination of a socket member having a cylindrical bore, a ball member extending into the socket member, means for articulating said ball member with the socket member, with capacity for universal movement with respect thereto, an exteriorly cylindrical annular gasket of compressible non-metallic material closely fitting but slidable within the socket member against the inner end of the ball member, an annular metallic follower engaging the rear end of the gasket, and a tubular corrugated metallic diaphragm interposed under compression between the follower and a portion of the socket member whereby the gasket is yieldingly forced between the socket and ball members with a capacity for follow-up movement to allow for wear of the parts, the tubular member forming a continuous wall around the steam passage to seal the joint against escape of steam between the gasket and socket member in all positions of the gasket.

EDWARD A. RUSSELL.